(12) United States Patent
Koppelaar et al.

(10) Patent No.: US 7,804,835 B2
(45) Date of Patent: Sep. 28, 2010

(54) IP DATAGRAM DE-ENCAPSULATION

(75) Inventors: Arie Geert Cornelis Koppelaar, Giessen (NL); Ludovicus Marinus Gerardus Maria Tolhuizen, Waalre (NL); Onno Eerenberg, Oisterwijk (NL)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 18 days.

(21) Appl. No.: 11/814,280

(22) PCT Filed: Jan. 16, 2006

(86) PCT No.: PCT/IB2006/050152

§ 371 (c)(1),
(2), (4) Date: Mar. 25, 2008

(87) PCT Pub. No.: WO2006/077523

PCT Pub. Date: Jul. 27, 2006

(65) Prior Publication Data

US 2008/0282310 A1    Nov. 13, 2008

Related U.S. Application Data

(60) Provisional application No. 60/644,545, filed on Jan. 18, 2005.

(51) Int. Cl.
*H04L 12/28* (2006.01)
(52) U.S. Cl. .................. 370/394; 370/474; 370/476
(58) Field of Classification Search .................. None
See application file for complete search history.

(56) References Cited

U.S. PATENT DOCUMENTS 5,959,659 A * 9/1999 Dokic .................. 725/152
6,226,291 B1 * 5/2001 Chauvel et al. .............. 370/392
6,556,588 B2 * 4/2003 Wan et al. ................... 370/474
7,076,725 B2 * 7/2006 Ikeda et al. .................. 714/789

(Continued)

OTHER PUBLICATIONS

International Standard ISO/IEC 13818-1: Information Technology—Generic Coding of Moving Pictures and Associated Audio Information: Systems, 2nd Edition, Dec. 1, 2000.

(Continued)

*Primary Examiner*—Ayaz R Sheikh
*Assistant Examiner*—Peter Chau
(74) *Attorney, Agent, or Firm*—Haynes and Boone, LLP (57) ABSTRACT

An apparatus (1001), system (1000) and method (800-900) are provided for improving the de-encapsulation of sections from Multi Protocol Encapsulation (MPE) (151) and Multi Protocol Encapsulation-Forward Error Correction (MPE-FEC) (152) Sections in a DVB-H transport stream. DVB-H is a standard for broadcasting services to hand-helds. Its difference from DVB-T, C, and S that is relevant for this invention is the presence of an additional layer of Forward Error Correction (FEC). Instead of restoring only correctly received sections (151) (152) the present invention also restores fragments of sections (151) (152) by using both Transport Stream packet headers (301. *i*.1) and section headers (151.1). As a result, entire sections (800-900) may not be erased (which can amount to up to 4080 bytes) whenever one or more fragments are received incorrectly, but only the incorrectly received fragments (which can be each up to 184 bytes) are erased. This leads to a more efficient use of the additional layer of Forward Error Correction (FEC) information.

15 Claims, 11 Drawing Sheets

U.S. PATENT DOCUMENTS

| | | | |
|---|---|---|---|
| 7,369,756 B2* | 5/2008 | Hallberg et al. | 386/131 |
| 7,388,871 B2* | 6/2008 | Cheung et al. | 370/401 |
| 7,415,652 B1* | 8/2008 | Szeremi | 714/758 |
| 7,496,821 B2* | 2/2009 | Stare | 714/751 |
| 7,508,839 B2* | 3/2009 | Vesma et al. | 370/466 |
| 7,530,007 B2* | 5/2009 | Touzni et al. | 714/776 |
| 2003/0076887 A1* | 4/2003 | Kim et al. | 375/240.26 |
| 2005/0089004 A1* | 4/2005 | Casaccia et al. | 370/347 |
| 2005/0129020 A1* | 6/2005 | Doyle et al. | 370/392 |
| 2006/0007953 A1* | 1/2006 | Vesma et al. | 370/466 |
| 2006/0239299 A1* | 10/2006 | Scheid et al. | 370/474 |
| 2007/0266294 A1* | 11/2007 | Vesma et al. | 714/758 |
| 2008/0288663 A1* | 11/2008 | Kovacevic et al. | 710/5 |

OTHER PUBLICATIONS

"Ultra Lightweight Encapsulation (ULE) for Transmission of IP Datagrams Over MPEG-2/DVB Networks; Draft-IETF-IPDVB-ULD-03.TXT" IETF Standard-Working-Draft, Internet Engineering Task Force, IETF, CH, vol. IPDVB, No. 3, Nov. 2004.

"Superflex MX2001 Series IP/DVB Encapsulator" International Datacasting, Mar. 2002.

* cited by examiner

IP DATAGRAM DE-ENCAPSULATION

CROSS-REFERENCE TO RELATED APPLICATIONS

This application claims priority from U.S. provisional patent application No. 60/644,545, filed on Jan. 18, 2005 in the U.S. Intellectual Property Office, the disclosure of which is incorporated herein by reference in its entirety.

BACKGROUND

The present invention relates to a system and method for digital video broadcast handheld (DVB-H) datagram de-encapsulation.

DVB-H is a new European Telecommunications Standards Institute (ETSI) standard for providing Digital Video Broadcasting (DVB) services to handheld devices (e.g., mobile phones), see Digital Video Broadcasting (DVB); DVB-H implementation Guidelines, ETSI TR 1XX XXX V0.1.0 (2004-09), the entire contents of which are hereby incorporated by reference. Provisions are made in this standard to support low-power receiver implementations. As with the prior ETSI standards DVB-S, C, and T, in DVB-H information is broadcast in so-called Transport Streams in which typically several MPEG-2 encoded Programs are multiplexed.

DVB-H is based on DVB-T, and is fully backwards-compatible. DVB-H provides additional features to support handheld portable and mobile reception that allows power saving, mobility with high data rates, single antenna reception, and SFN networks, among others. DVB-H also provides impulsive noise tolerance and increased general robustness as well as support for seamless handover during power off-times.

All of the foregoing features are achieved by adding options to DVB-T including, but not limited to, time-slicing for power saving, MPE-FEC frames (explained below) for additional robustness, and a 4k mode for mobility and network design flexibility. In DVB-H, data is bundled in "bursts" at a high rate so that it is possible to switch off the receiver between bursts, realizing up to 90% energy savings. Time-slicing also permits a simple handover during absence of the service. In order to establish a convergence between the traditional broadcast world and the PC world, IP encapsulation is introduced. To extend this to the small multimedia devices, IP encapsulation is combined with time-slicing. DVB-H is meant for IP-based services using Multi Protocol Encapsulation (MPE). Additional robustness is provided to the DVB-H system by protecting the MPE-sections with an extra layer of Forward Error Correction (FEC) coding, thus the nomenclature MPE-FEC frame. DVB-H can share DVB-T multiplex with MPEG2 services.

Figure 1A:
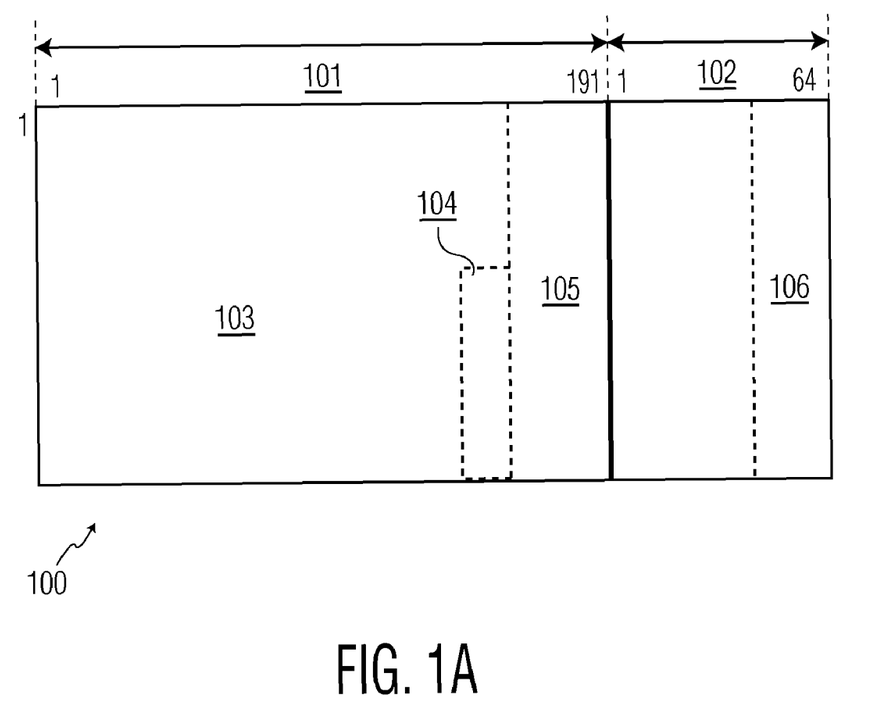
FIG. 1a illustrates the structure of an MPE-FEC frame.

An MPE-FEC frame 100 comprising an Application data table 101 and a Reed-Solomon (RS) data table 102 is specified in the ETSI standard as the transmission frame format, see FIG. 1. In a straightforward approach to IP datagram de-encapsulation, all locations in the MPE-FEC frame that correspond to an incorrectly received IP datagram are marked as erasures. Since IP datagrams can have a size up to 4080 bytes, large parts of an MPE-FEC frame may be erased in this way. Similarly, the data in the Reed Solomon data table, which is transmitted on a per column basis in so called MPE-FEC sections, can lead to erased parts of 1024 bytes (in general the erased parts are equal to the number of used rows in an MPE-FEC frame). So, a straightforward solution is neither effective nor efficient.

A technique is needed for processing received MPE-FEC frame data that allows only a part of the symbols of an IP datagram and the Reed Solomon data to be marked as an erasure for the MPE-FEC decoder.

SUMMARY

The system and method of the present invention provide an effective and efficient method for reconstruction of received MPE-FEC frames in which erasing takes place in parts of 184 bytes (payload of TS packet).

The maximum IP datagram size is 4080 bytes, while a simple approach to IP datagram de-encapsulation could result in large parts of an MPE-FEC frame being erased, e.g., up to 4080 bytes for the maximum size datagram.

In the present invention, a fragment is defined as the part of one IP datagram that is contained in one TS packet, and a fragment memory is maintained to assist in de-encapsulation of an IP-datagram. The present invention assumes that a datagram is packed into consecutive TS packets and uses the continuity counter (CC) in the TS packet header to position a received fragment in the fragment memory. Extrapolation and interpolation are also used to position a fragment in the fragment memory.

BRIEF DESCRIPTION OF THE DRAWINGS

FIG. 1b illustrates the sequencing of sections for transmission that corresponds to the MPE-FEC frame of FIG. 1a;

DETAILED DESCRIPTION

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

The system and method of the present invention provides an IP de-encapsulation method in which apart from correctly received sections also partly correct received sections are processed in order to recover as much as possible from the section payload, which in the case of DVB-H consists of IP datagrams and parity data belonging to the extra layer forward error correction (MPE-FEC).

Figure 1B:
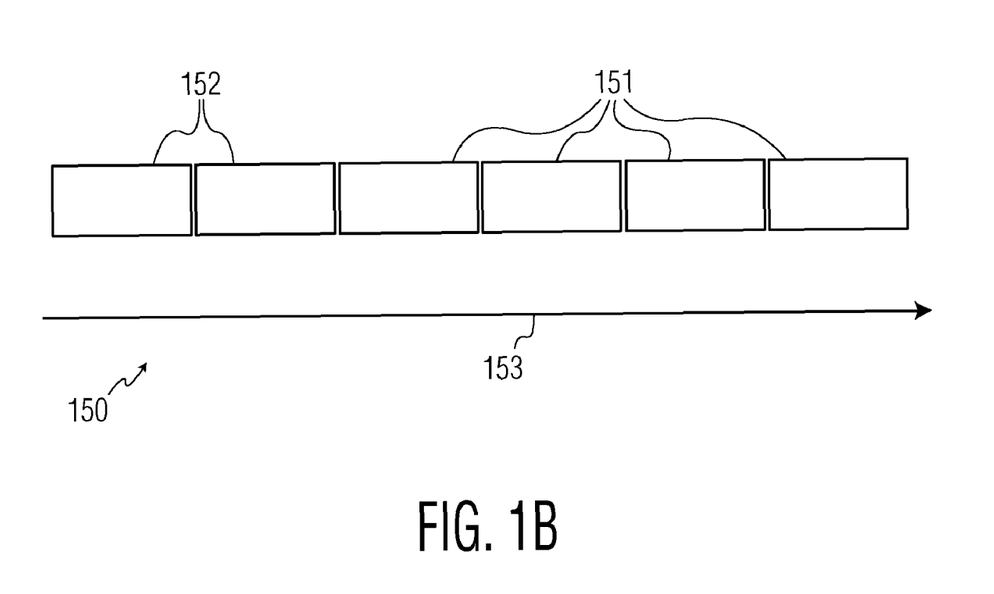

Referring to FIG. 1a, an MPE-FEC frame 100 is a table of bytes with 255 columns and a flexible number of rows, where each row is a code word of a Reed-Solomon code. The number of rows is equal to 256, 512, 768 or 1024, and the actual used number of rows is signaled in the time_slice_fec_identifier_descriptor that is transmitted in PSI/SI tables (Program Specific Information/Service Information), see DVB Specification For Data Broadcasting, Modified Version of DVB-H Additions Including CA Support, Final Draft, ETSI EN 301 192 V1.4.1,DVB-H201r1, the entire contents of which are hereby incorporated by reference. That is, the maximum allowed value for this size is 1024, which makes the total MPE-FEC frame almost 2 Mb in size. Each position in the MPE-FEC frame holds a byte. The left side 101 of the MPE-FEC frame, consisting of the 191 leftmost columns, is dedicated to IP datagrams 103 and possible padding 104, and is called the Application data table. The right side 102 of the MPE-FEC frame, consisting of the 64 rightmost columns, is dedicated to the parity bytes of the FEC code and is called the RS data table. Each byte position in the Application data table has an address ranging from 1 to 191×No_of_rows. Similarly, each byte position in the RS data table has an address ranging from 1 to 64×No_of_rows. Addressing in RS table is redundant, since section_length and section_number are known. Referring now to FIG. 1b, the IP datagrams are transmitted using so-called MPE sections 151, and the RS data is transmitted using so-called MPE-FEC sections 152.

Figure 2:
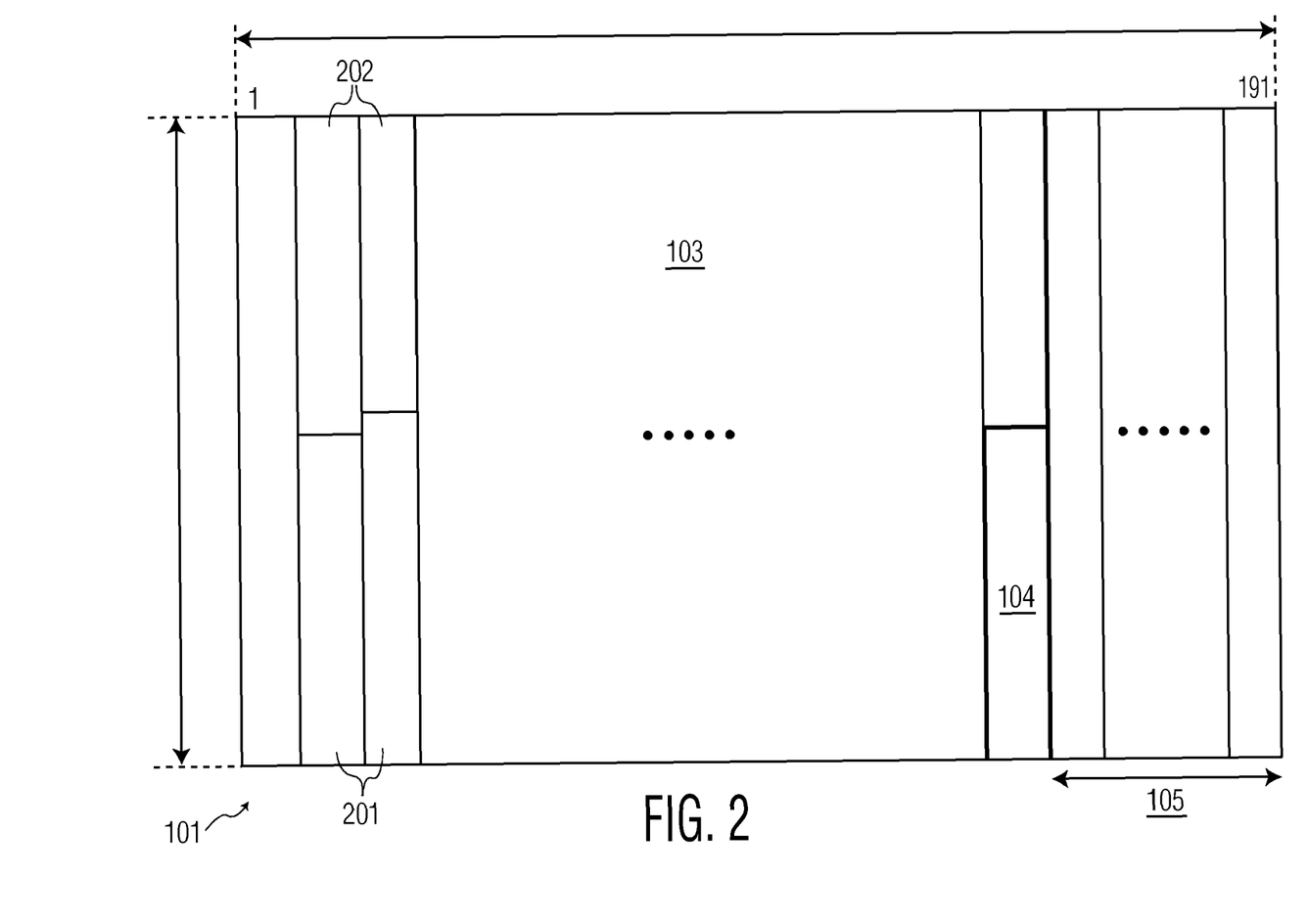
FIG. 2 illustrates an application data table part of an MPE-FEC frame.

IP datagrams are placed datagram-by-datagram in the Application data table, starting with the first byte of the first datagram in the upper left corner of the table and going downwards the first column. The length of the IP datagrams may vary arbitrarily from datagram to datagram. The maximum size of an MPE section is 4096 bytes, so that IP datagrams up to 4080 bytes can be encapsulated (4096 byte−12 bytes section header−4 bytes CRC). Immediately after the end of an IP datagram, the next IP datagram starts 201 (see FIG. 2). If an IP datagram does not end precisely at the end of a column, it continues at the top of the following column 202. When all IP datagrams have been placed in the Application table 101, any unfilled byte positions are padded 104-5 with zero bytes, which completely fills the leftmost 191 columns. The number of full padding columns 105 is signaled dynamically in each of the MPE-FEC sections (i.e. the sections that carry the RS parity bytes) with 8 bits.

Figure 3:
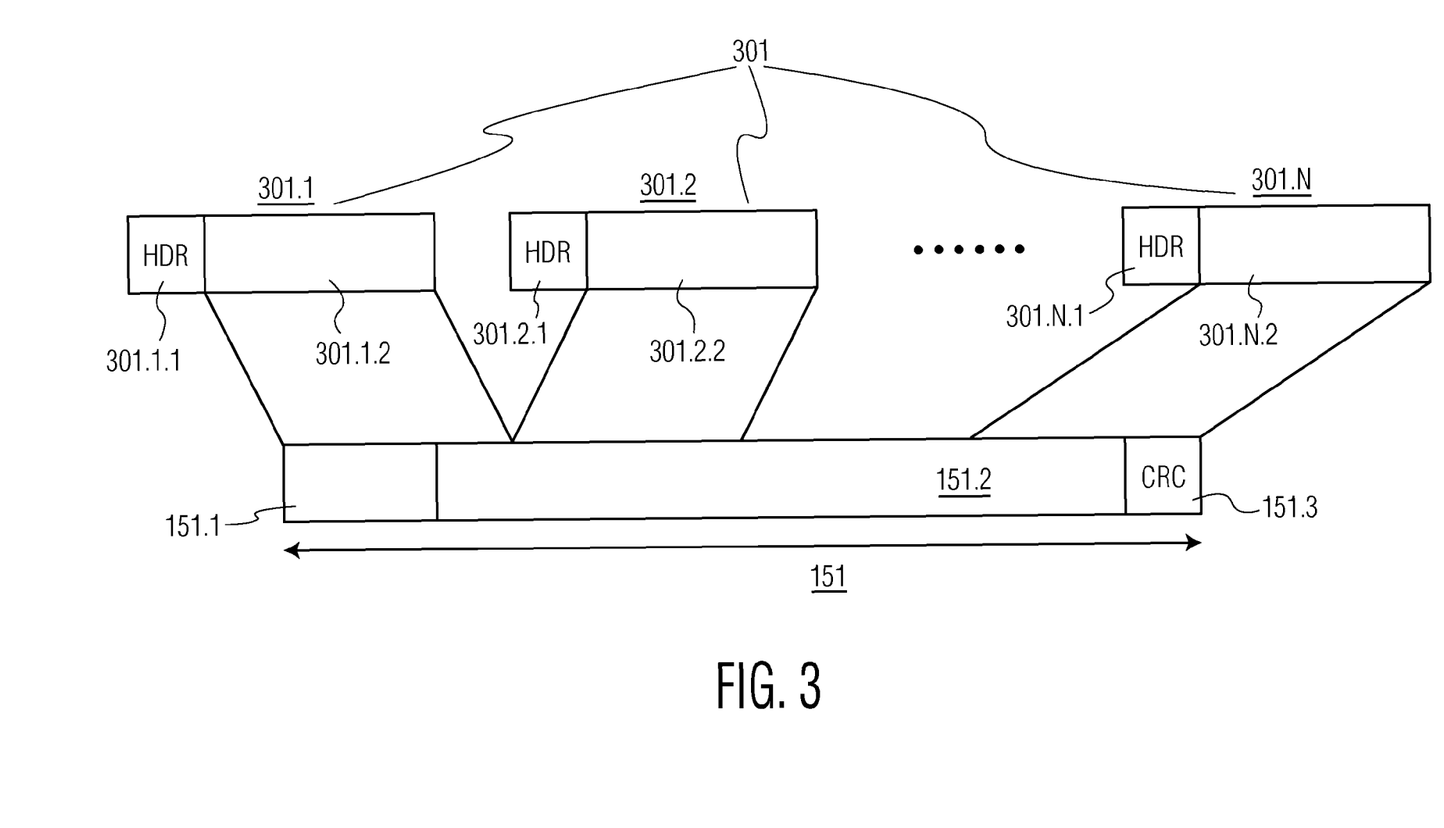
FIG. 3 illustrates how an IP datagram of an MPE-FEC frame is broken up into TS packets for transmission.

The IP data is carried in MPE sections 151 in the standard DVB way, irrespective of whether MPE-FEC is used. An IP datagram is carried within one single MPE section. One Transport Stream (TS) packet payload 301 may contain one or more MPE sections 151 and one MPE section 151 may be fragmented into one or more TS packet payloads 301, as illustrated in FIG. 3. This makes reception fully backwards-compatible with MPE-FEC ignorant receivers. Each MPE section 151 includes a start address for the IP datagram that it contains. This start address indicates the position of the first byte of the IP datagram in the application data table and is signaled in the MPE header. The receiver is then able to place the received IP datagram in the correct byte position in the Application table and mark these positions as 'reliable' for the RS decoder, provided the CRC-32 check 151.3 shows that the section is correct.

The last section of the Application data table 101 contains a table_boundary flag that indicates the end of the IP datagrams within the Application data table. If all previous sections within the Application data table have been received correctly, the receiver does not need to receive any MPE-FEC section and if Time-slicing is used, can go to sleep without receiving and decoding RS data.

If MPE-FEC sections 152 are received, the exact number of padding columns in the Application data table is indicated with 8 bits in the section header of the MPE-FEC sections 152 and it is only if RS decoding is performed that this value is required.

The parity bytes are carried in a separate, specially defined section type having its own table_id.

Figure 4:
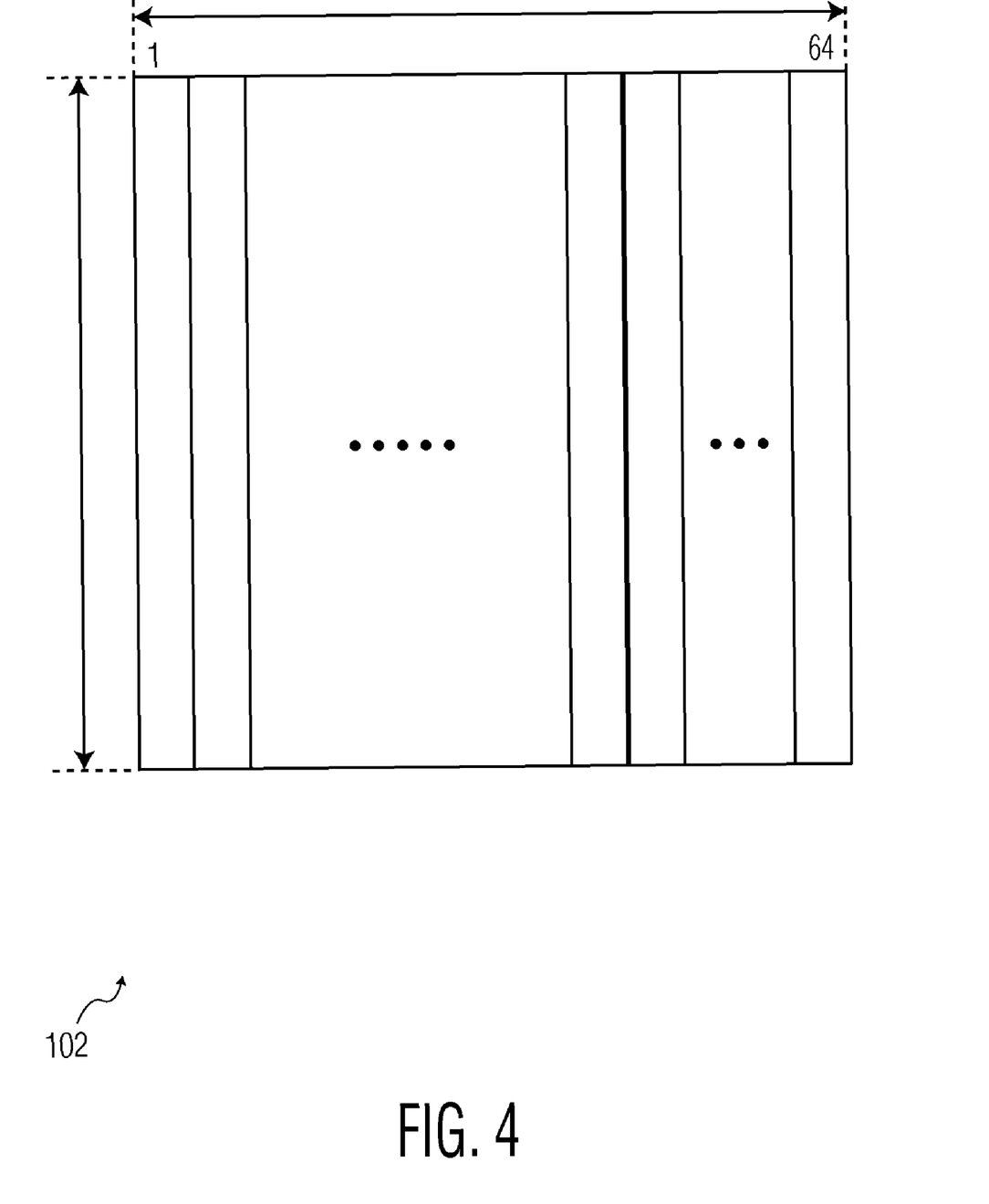
FIG. 4 illustrates a Reed-Solomon data table of an MPE-FEC frame.

Referring now to FIG. 4, with all the leftmost 191 columns of the Application data table filled in the MPE-FEC frame it is now possible, for each row, to calculate the 64 parity bytes of the RS data table 201 from the 191 bytes of IP data and possible padding. The code used is a byte-oriented [255,191, 65] Reed-Solomon code with field generator polynomial $p(x)=x^8+x^4+x^3+x^2+1$ and code generator polynomial $g(x)=(x+\square^0)(x+\square^1)(x+\square^2) \ldots (x+\square^{63})$, where $\square=02_{HEX}$.

Each row of the Application data table contains one RS codeword. Some of the rightmost columns of the RS data table may be discarded and hence not transmitted, to enable puncturing. The exact amount of punctured RS columns can be determined from the last_section_number field in the MPE-FEC section header and may change dynamically between frames. Having the RS data table 102 completely filled, the MPE-FEC frame 100 is ready for being inserted in the Transport Stream and can be transmitted.

At the receiver the MPE-FEC frame 100 has to be reconstructed as good as possible in order to correct possible transmission errors with the MPE-FEC decoder (the RS code). The IP datagrams can be retrieved by extracting MPE sections 151 from the Transport Stream. The MPE section header signals the absolute address of the enclosed IP datagram in the Application data table 101. Similarly, the parity bytes of the RS code can be retrieved and put in the RS data table 102 by extracting MPE-FEC sections 152 from the Transport Stream. The MPE-FEC section header also contains absolute address information of the enclosed parity column in the RS data table. Moreover, address information for the parity columns is redundant since only one parity column per MPE-FEC section 152 is transmitted and the MPE-FEC section header contains a sequence number from which the column position can be derived.

The last section of the Application data table contains a table_boundary flag, which indicates the end of the IP datagrams within the Application data table. If all previous sections within the Application data table have been received correctly, the receiver does not need to receive any MPE-FEC sections 152 and can go to sleep without receiving and decoding RS data if Time Slicing is used.

If, due to reception problems, one or more IP datagrams are not received, then the corresponding locations in the Application table can be erased, i.e., the decoder can be informed that these word positions are likely to be in error.

The MPE-FEC code has a Hamming distance of d=65 and therefore it is possible to correct up to t=32 random errors or e=64 erasures (byte positions from which the reliability information indicates that these positions are likely to be erroneous). In general, t error and e erasure decoding is possible provided that 2t+e<d.

Before the MPE-FEC decoding can start the MPE-FEC frame has to be rebuilt. This means that IP de-encapsulation has to be done and the RS parity information has to be gathered. IP datagrams are encapsulated in MPE sections 151. The MPE section header gives information about the section length and the address of the IP datagram in the Application data table 101. The section length is related to the IP datagram length, it equals the IP datagram length+section header length (=9 bytes)+CRC length (=4 bytes). For MPE-FEC sections the MPE-FEC length calculation is similar, whereby the section header length has a different value (=5 bytes) and an extra field containing real-time parameters is added to the equation (=4 bytes).

Below some situations are sketched that make the reconstruction of an MPE-FEC frame more difficult.

Figure 5:
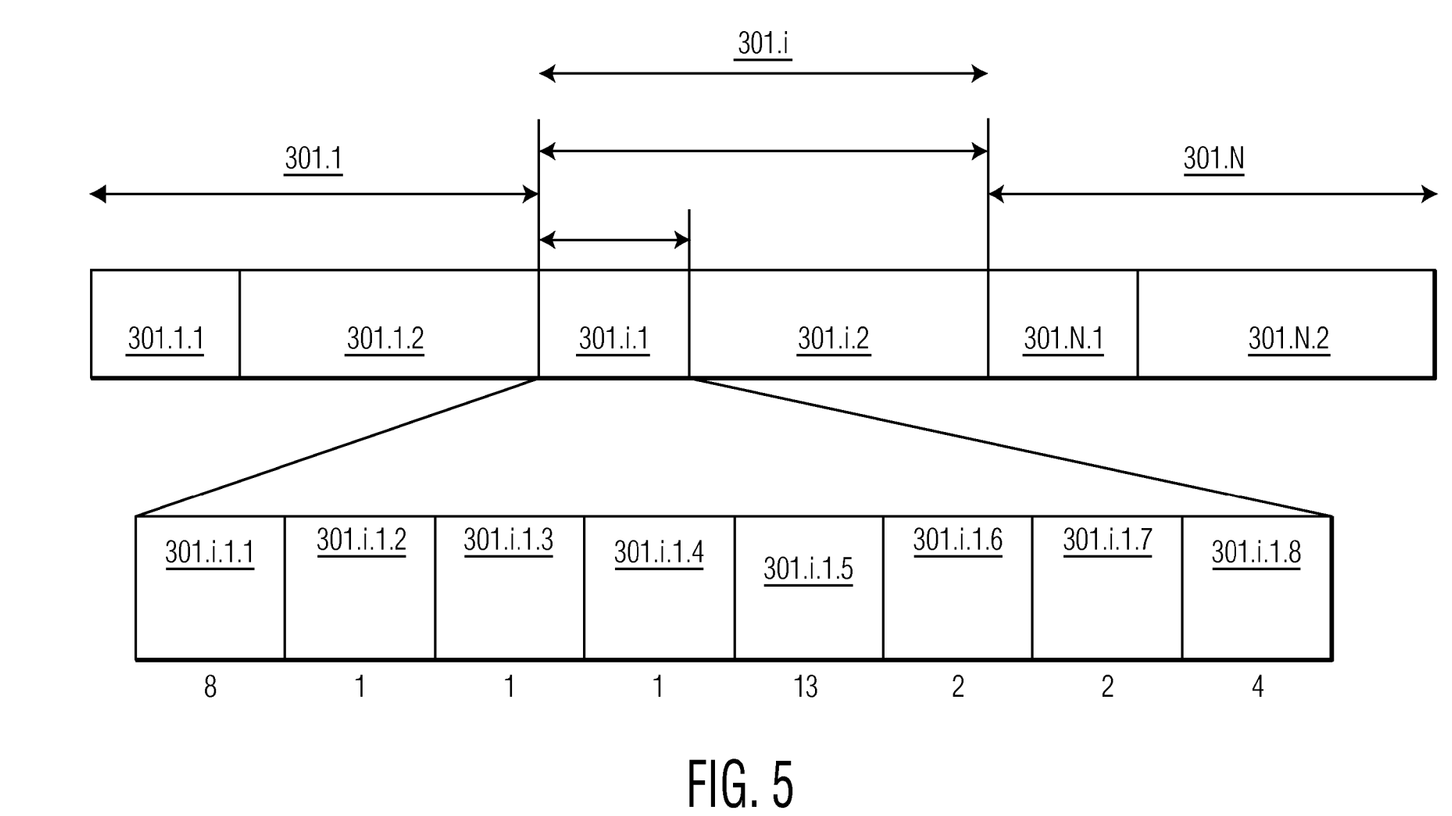
FIG. 5 illustrates a TS packet format for MPE-FEC frame transmission.

Referring now to FIG. 3, an example of IP de-encapsulation is illustrated. In this example, an MPE section 151 is distributed over N TS packets 301. The section header 151.1 and a part of the IP Datagram 151.2 is present as the payload 301.1.2 n TS packet 1 301.1. The rest of the IP datagram and the 32-bit CRC is present in TS packet 2 301.2 up to N 301.N. Transmission errors may complicate correct re-building of the MPE-FEC frame 100. The following situations are identified:

1. TS packet 1 301.1 is erroneous and the transport error indicator (tei) in the TS packet header 301.$i$.1.2 for i=1 (see FIG. 5) is set to 1 by the RS decoder in the channel decoder, indicating that the RS decoder was not capable of correcting the TS packet. In this case the section header can be corrupted and no reliable information about section length and Application Data table addressing is available. Most implementations of a TS demultiplexer will discard TS packets with tei=1 and therefore the section header will (can) not be processed, leading to a lack of both address information and section length information. One consequence is that the payload of TS packet 2 up to N cannot be put directly in the MPE-FEC frame, even if these packets are received correctly, because table address information is lacking. A straightforward implementation of an IP de-encapsulator, as described above, ignores TS packets 2 through N and waits for the next MPE section header and leads thus to error propagation.
2. TS packet 1 is erroneous but the transport error indicator is set to zero (miss-correction of the RS decoder). Somewhere in the TS packet there must be an error. If the error is in the PID (packet identifier) field, the packet will not be selected by the TS de-multiplexer. See also 4.
3. TS packet 1 is correct, but one or more of the other TS packets is erroneous. In this situation, the section length as well as the Application Data table addressing is reliable. With the aid of the continuity counter in the header of correct TS packets, one can try to erase the fragments of the IP datagram that are in the erroneous TS packets. Note that it can happen that the section header is distributed over two TS packets.
4. None of the N TS packets is detected to be erroneous by the RS decoder, but the CRC fails. In this case, one (or more) miss-detection(s) of the RS decoder took place, but after all it is impossible (difficult) to find out which of the TS packets is in error. So, it can also be the first TS packet such that section length and Application Data Table addressing becomes unreliable. If one completely trusts an erroneous section length one can encounter propagation problems to the next MPE sections (section length that is too long can result in a missed section header of the next section). Propagation errors can be limited by using the payload unit start indicator.
5. One of the TS packets 2 through N is not filtered (selected) by the PID filter due to an error in the PID value. In this case, there is a packet deletion and the true boundary of the section is ignored. This leads to error propagation to the next section. This deletion error can be detected with the continuity counter in the next TS packet header.
6. Due to an error in the PID value, an unwanted TS packet is considered to be a wanted TS packet (value 2 through N). An insertion error can be detected by observing the continuity counter in the TS packet header. An insertion or deletion error will probably be accompanied with a transport error indicator equal to one.

Figure 6:
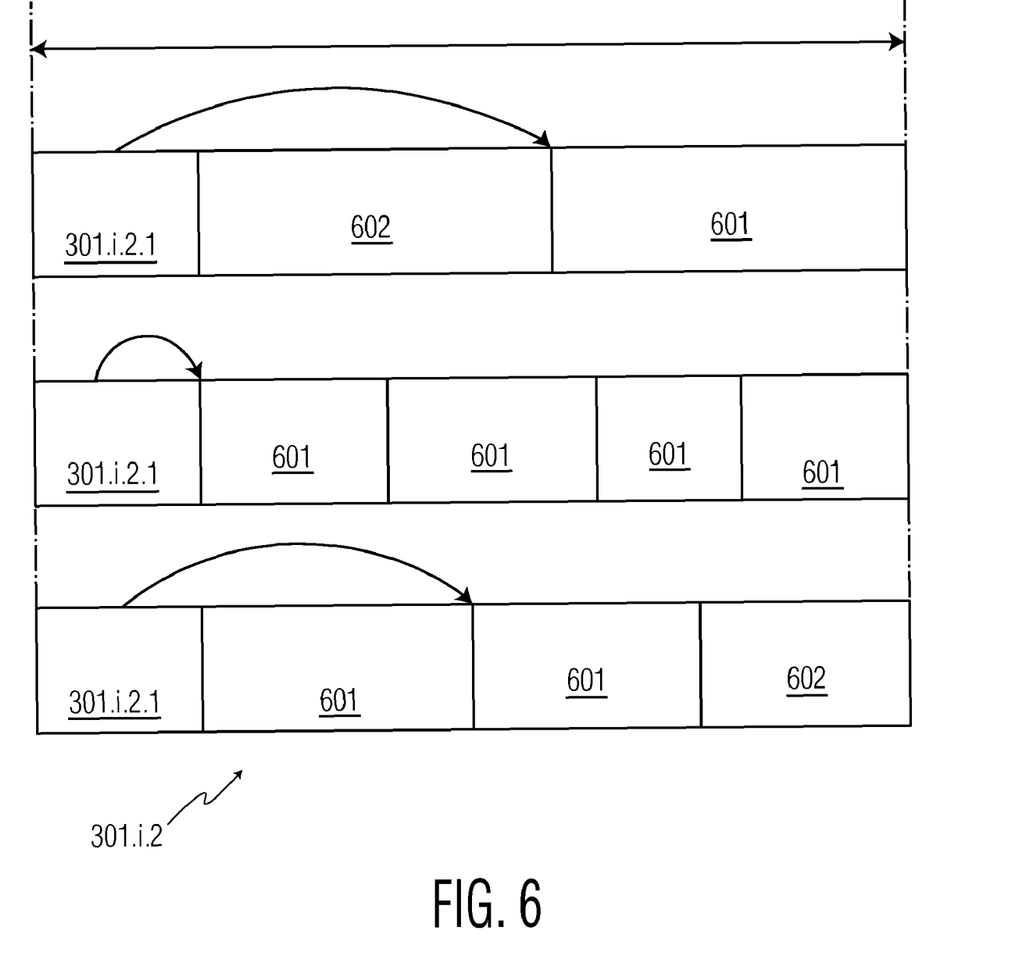
FIG. 6 illustrates how an IP datagram is broken up into MPE sections for transmission in TS packets.

FIG. 6 illustrates some of the various ways that sections can be embedded in the payload of TS packets. The pointer field 301.$i$.2.1 indicates the start of a new section and is present only when a new section starts (indicated with the payload_unit_start_indicator in the TS packet header).

The maximum IP datagram size is 4080 bytes, while a TS packet can contain at most 184 bytes of payload. A fragment is defined as the part of one IP datagram that is contained in one TS packet.

Assuming that the datagrams are packed into consecutive TS packets as efficiently as possible, one can expect that a maximum length IP datagram is divided into approximately $$N = \left\lceil \frac{4080}{184} \right\rceil = 23 \text{ fragments}.$$

Moreover, in the present invention, the use of a TS continuity counter (CC) in the TS packet header also decreases error propagation (borders of sections) and detects anomalous effects before a cyclic redundancy check CRC is calculated. From a received TS packet, the IP fragment is put in the Fragment Memory. The Fragment Memory is memory in which fragments of an IP datagram are stored until the reception of an IP datagram is completed. Using the continuity counter (CC) in the TS packet header it is possible to determine (to a certain degree of certainty) the position of the fragment (i.e. the fragment pointer) in the Fragment Memory. A single missed fragment can also be detected. Note that the continuity counter is a 4-bit counter, so its effective range is limited.

Fragments can vary in length due to stuffing. In the case of private sections, see, e.g., ISO/IEC 13818-1, Information Technology-Generic coding of moving pictures and associated audio information: Systems, 2.sup.nd edition 2000-12-01, the entire contents of which are hereby incorporated by reference, two mechanisms can be used for stuffing. If adaptation fields are used for stuffing, this is signaled in the Transport Stream header. With adaptation fields, the stuffing takes place before the actual payload. Another form of stuffing is dedicated to PSI and private sections (hence also MPE sections). In that case stuffing takes place after the last byte of a section, and a new section starts in the next TS packet with a pointer field having a value of zero. At the decoder this kind of stuffing can be detected by using the section length, i.e. if the expected number of bytes of a section has been retrieved from a TS packet and the payload unit start indicator does not signal the start of a new section, then the remaining bytes should be stuffing bytes (stuffing bytes have value 0x.FF).

Assuming that the last received fragment belongs to the same IP datagram, it is possible to extrapolate the fragment address from the address information that is available in the section header using the section length. If these fragments do not belong to the same IP datagram (the section length gives an idea about how many fragments are needed for the IP datagram, this can be used for determining whether a received fragment belongs to the same IP datagram) the table address of the (very) next section header can be used and these fragments can be placed just before the next start of the next IP datagram.

Correctly received fragments that are between the first and the last missed fragments are called floating fragments. In principle, floating fragments lack address information. If all fragments (except the first and the last) have the same length, address interpolation can be used to obtain the address of the floating fragments. Otherwise more advanced techniques are needed (e.g. partial decoding of the MPE-FEC frame such that one can estimate the position of the floating fragments).

Since the fragments of IP datagrams belong to different TS packets, they can have different levels of soft erasure information (e.g. the number of corrected errors). The CRC calculation is only beneficial if no missed fragments are detected.

In a preferred embodiment, erasing takes place in units of 184 bytes (payload of TS packet). Moreover, the use of the TS continuity counter also decreases error propagation (borders of sections) and provides detection of anomalous effects before the CRC is calculated.

Figure 7:
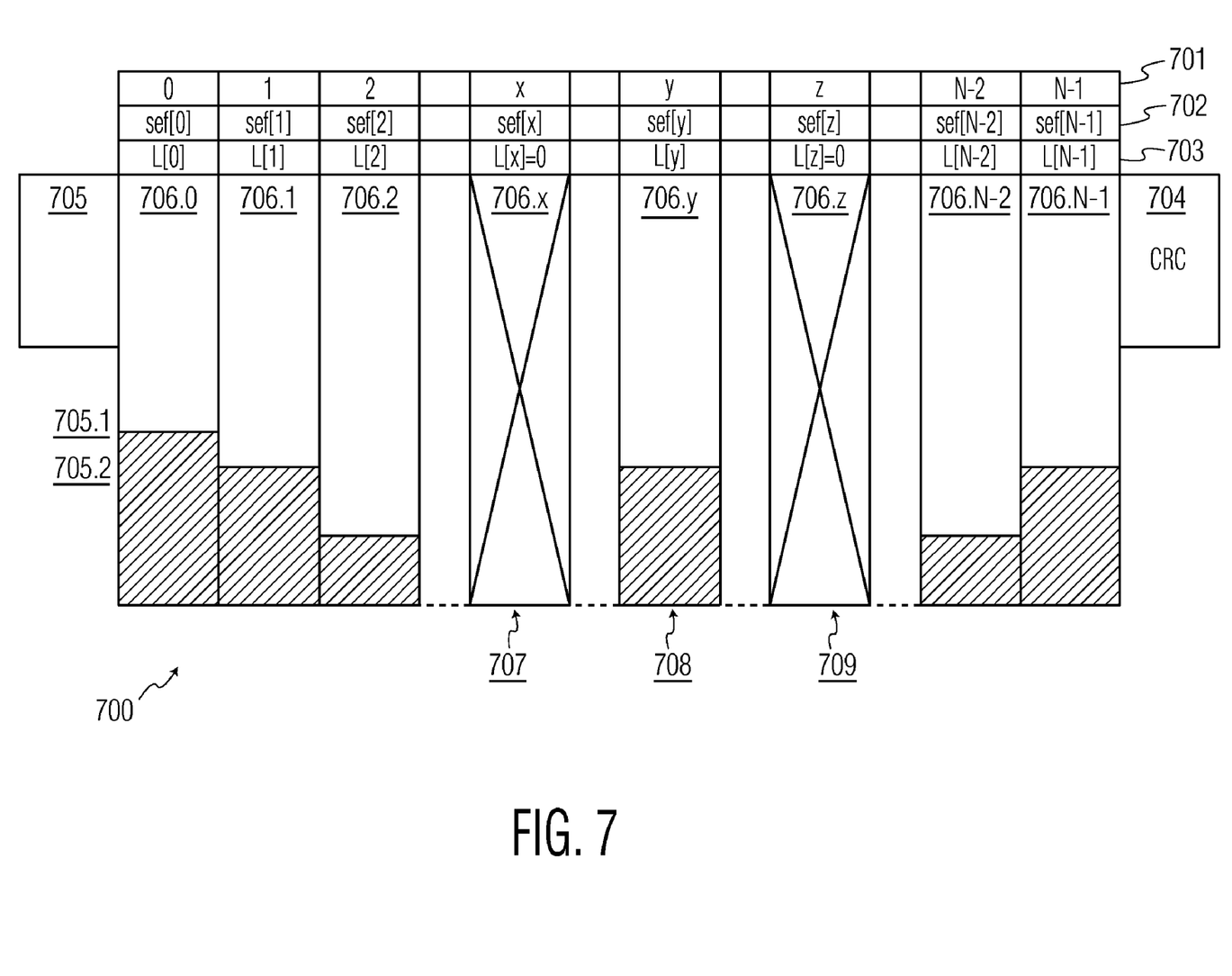
FIG. 7 illustrates a Fragment Table or Fragment Memory for reconstruction of an MPE frame by a DVB-H de-encapsulator modified according to the present invention.
Figure 8:
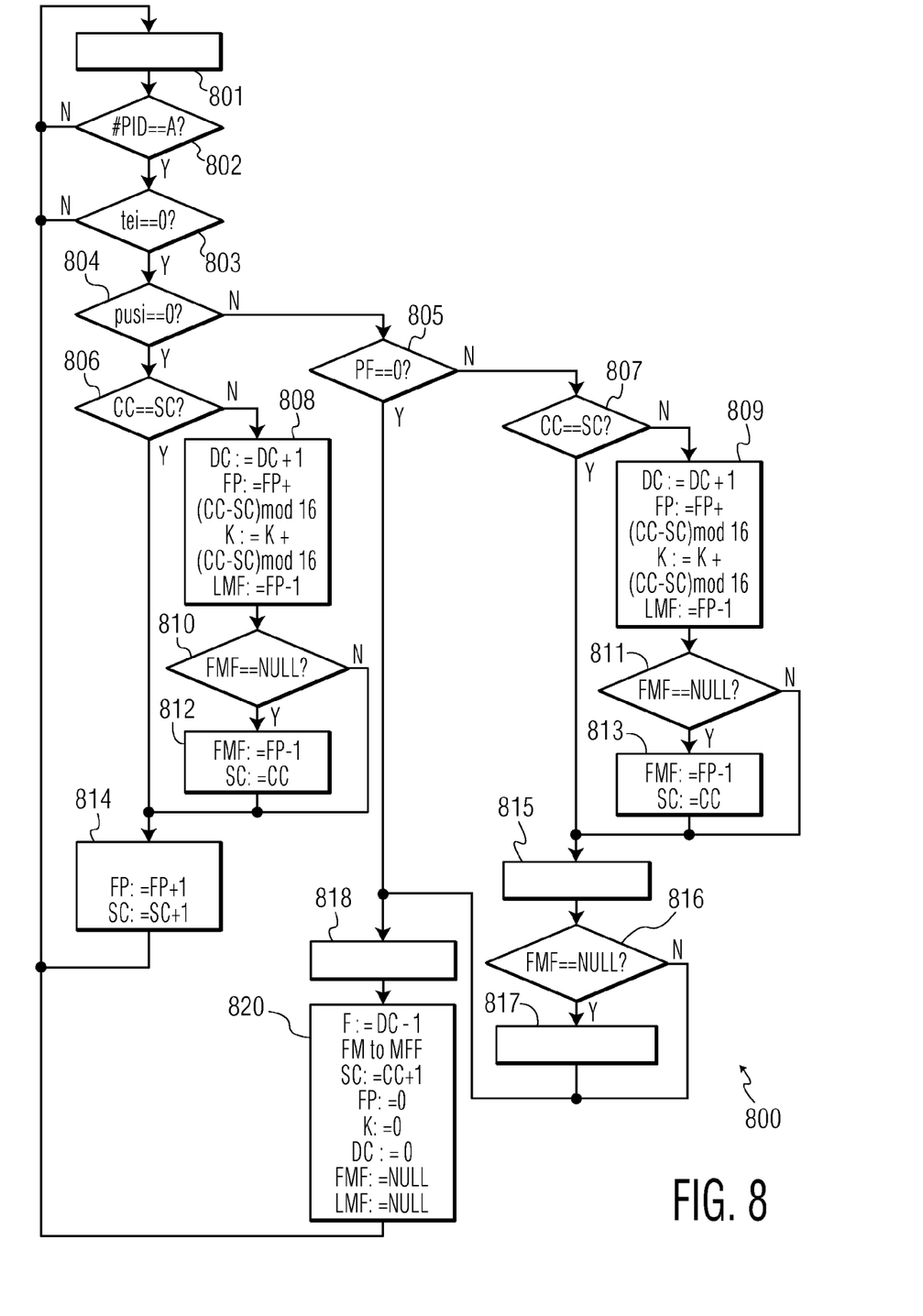
FIG. 8 illustrates a flow chart of reconstruction of an MPE frame using the Fragment Memory by a de-encapsulator modified according to the present invention.

In FIG. 8 a flow diagram of IP de-encapsulation of a preferred embodiment is illustrated. Prior to placing an IP datagram into an MPE frame, fragments of the IP datagram are put into a scratch memory called a Fragment Memory, see FIG. 7. When, due to corrupted TS packets, fragments of the IP datagram are lost, the Fragment Memory provides an efficient way of reconstructing the IP datagram.

In the flowchart of FIG. 8 it is assumed that an MPE section header is not distributed over two Transport Stream Packets and that the time-sliced service that is selected by the user has PID value "A".

At step 801, the TS packet header 301.*i*.1 is read. At step 802, the packet identifier is checked to see if it is equal to "A". An elementary stream, (e.g. a time-sliced service) is characterized by the PID value in the TS header. In PSI (Program Specific Information) tables a mapping between elementary streams and PID values is made, such that a receiver on the basis of this table can see what the PID value is of the desired elementary stream. In FIG. 8, the value "A" stands for the PID value of the desired time-sliced service. If it is not the desired service, then the next TS packet header is read by performing step 801. If the Packet IDentifier PID is equal to "A", then at step 803 if the transport error indicator (tei) is on, then the next TS packet header is read by performing step 801, since the current packet contains errors. If the tei indicator is off, then at step 803 the payload unit start indicator is checked to see if a new section starts.

At step 806, if no new payload is starting, then at step 806 the continuity counter (CC) is checked against the shadow counter (SC), and if CC=SC, then step 814 is performed. If CC≠SC at least one packet has been missed (pusi=0, means that no new section header is starting in the payload of the TS packet and therefore IP de-encapsulation of the current IP datagram is proceeded by retrieving a new fragment).

At step 808, the discontinuity counter is incremented (DC:=DC+1) and both the missed fragment counter (K) and the Fragment Pointer (FP) are incremented with the difference Mod (16) between the continuity counter (CC) and the shadow counter (SC), and the Last Missed Fragment (LMF) is set to the new value of the Fragment Pointer (FP)−1, since more than one fragment (i.e., TS packet) could have been missed (lost). If this is the First Missed Fragment, i.e., FMF is null at step 810, then at step 812 the First Missed Fragment (FMF) is set to the fragment pointer FP−1 and the shadow counter (SC) is set equal to the continuity counter (CC). Regardless of whether this is the First Missed Fragment, the current fragment is not in error and step 814 is performed. Counter (K) counts the number of missed fragments based on the difference between the continuity counter (CC) and the shadow counter (SC). The discontinuity counter (DC) counts the number of discontinuities. From the value of DC one can derive the number of floating groups of fragments (a group is at least one or more consecutive fragments that are floating), i.e. F:=DC−1

At step 814, the current payload is stored in the Fragment Memory (FM) at the location indicated by the Fragment Pointer (FP), the Fragment Pointer is incremented to the next fragment (FP:=FP+1) in the Fragment Memory (FM), and the shadow counter (SC) is incremented by one (SC:=SC+1). The next TS packet header is then read by performing step 801.

At step 805, when a new section is starting (pusi≠0), the pointer field of the TS header is checked to see if the new section starts directly after the Pointer Field (pointer field=0) and if so step 818 is performed (this corresponds to the situation illustrated in the second row of FIG. 6). Otherwise (Pointer Field≠0) the last fragment of the current section (or IP datagram) is retrieved from the TS packet payload (step 807 etc) before the section header of the new section is read (step 818). "pusi" stands for Payload Unit Start Indicator and this flag signals the start of a new payload (section) somewhere in the payload of a transport packet. The Pointer Field (PF) points to the position in the transport packet (see FIG. 6) where the new sections starts.

At step 818, the section header in the TS packet payload (pointed at by the pointer field of the payload) is read. The contents of the Fragment Memory are transferred to an Application data table for an MPE-FEC frame (MEF) at step 820, because receipt of an IP datagram is completed. Reception of an MPE-FEC frame is completed after all IP datagrams (signaled with a table-boundary flag) and all RS-data columns (signaled with a frame-boundary flag) are received. Then MPE-FEC decoding can start. After MPE-FEC decoding is finished, the Application data table (i.e. the IP datagrams) can be transferred to the Application Engine (kind of host processor on which the actual application runs in a mobile/portable device), the shadow counter (SC) is set to the continuity counter (CC) plus 1 (SC:=CC+1), the Fragment Pointer (FP) is reset to zero, and the First Missed Fragment (FMF) and Last Missed Fragment (LFM) are both reset to null. Then step 801 is performed to read the next TS packet header.

If, at step 805, the Pointer Field (PF) of the TS packet payload is not zero, then the payload contains apart from a (new) section header, also a remainder from the current section (see row 3 of FIG. 6) and the continuity counter (CC) should be equal to the shadow counter (SC) at step 807 or at least one packet has been missed. If at least one packet has been missed then steps 809 through 813 are performed to record at least one packet as missing, the Fragment Pointer (FP) is adjusted to the fragment following the missed packets, and the shadow counter (SC) is set equal to the continuity counter (CC). In either case, at step 815 the payload is stored in the Fragment Memory (FM) at the location indicated by the Fragment Pointer (FP). At step 816, if the First Missed Fragment (FMF) is null, indicating that the contents of the Fragment Memory (FM) are correct, then CRC processing is performed at step 817. Then, in any event, step 818 is performed to read the section header that is contained in the TS packet payload. The shadow counter (SC) is meant for detecting discontinuities in the Transport Stream (distorted TS packets). If both the end of a section and the start of a new section are missed, then the payload that is written to the Fragment Memory will belong to two or more different IP datagrams. In this case the Fragment Memory can be too small. By calculating the expected number of fragments (using the section length) it is possible to get some indication whether or not the payload belongs to two or more IP datagrams. This can also have consequences for the way fragments are put in the MPE-FEC frame (address interpolation and extrapolation.

In the flow chart of FIG. 8, distributed section headers (i.e. section headers that are distributed over two TS packets) are not considered. Hence, the flow-chart has to be adapted in order to allow section headers that are distributed over several TS packets, and since one skilled in the art will be able to readily accomplish this adaptation it is not included in FIG. 8. Moreover, more than one section can be present in a TS packet (also this is not included in FIG. 8 for the same reason).

The result of the CRC processing is used for assigning erasures.

Figure 9:
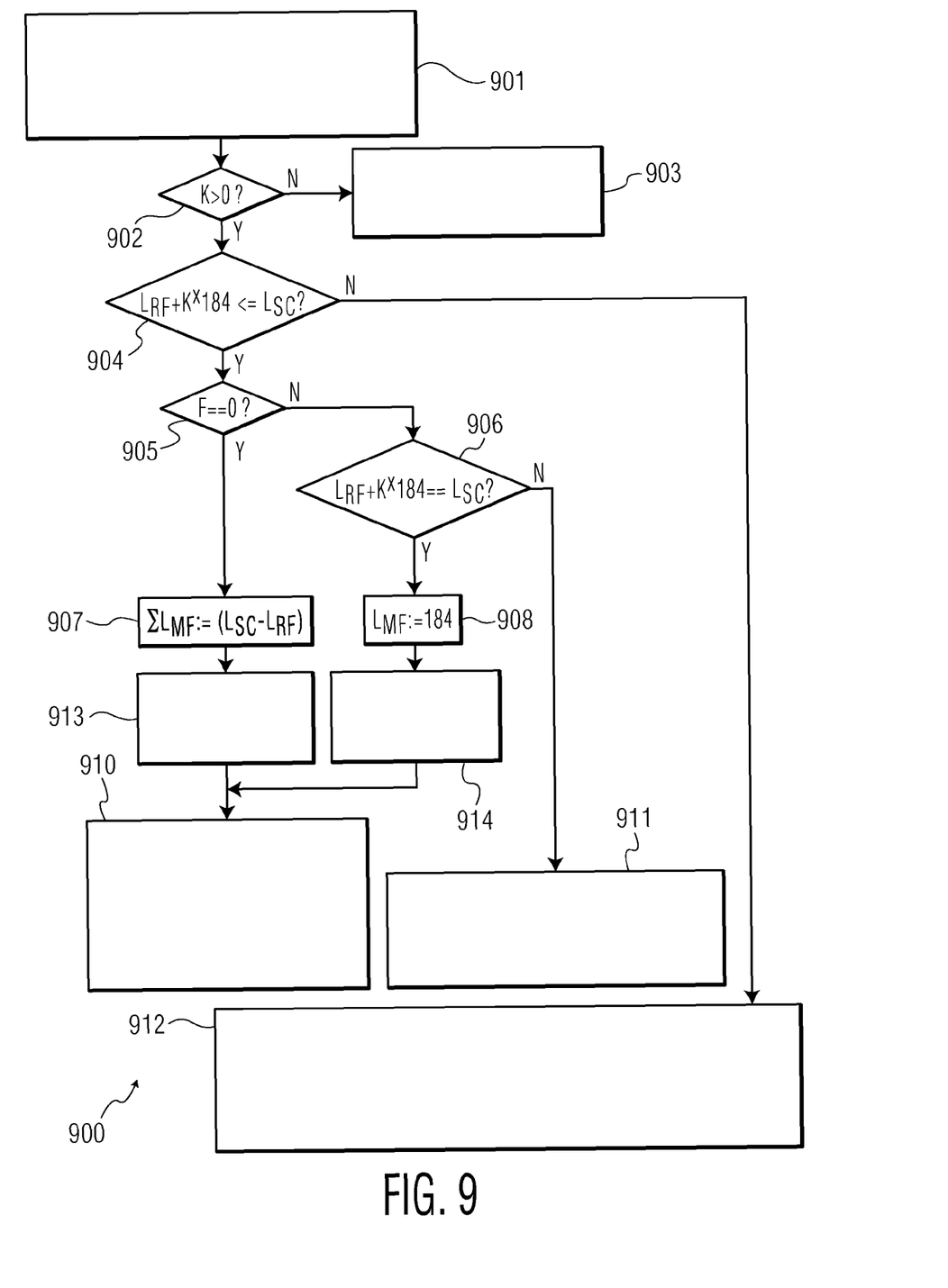
FIG. 9 illustrates a flow chart of transfer of at least one section from fragment memory to frame memory.

Referring now to FIG. 9, a flow is illustrated for the transfer of the fragments stored in columns 706.$i$ of the Fragment Memory 700 to an MPE-FEC frame memory 1004.

The number of missed fragments is K.
The number of floating groups of fragments is F.
$L_{RF}$ is the sum of the lengths of the received fragments.
$L_{SC}$ is the length of the section payload—(e.g., length of IP datagram). This discussion and procedure are meant to apply to both MPE and MPE-FEC sections. IP datagrams are used as an example only for explication.

At step 902 a test is made to determine if there are missed fragments (K>0?). If there are no missed fragments (K=0), all the fragments 706.$i$ of the Fragment Memory 700 are placed directly in the MPE-FEC frame memory 1004 at step 903. There is no address ambiguity because the fragments in the Fragment Memory 706.$i$ are placed consecutively in the MPE-FEC frame memory 1004.

At step 902, if K>0 there are missed fragments but the length of the missed fragments is not known. If no Adaptation Field stuffing is used, the payload of a TS packet is completely used for section data, i.e., a missed fragment should have length 184 bytes. Whether $L_{RF}+K*184<=L_{SC}$ is tested at step 904 and the presence of floating fragments is tested at step 905. If no groups of floating fragments are present (F=0) the missed fragments are consecutive and there is a gap in the section (e.g., IP Datagram) whose fragments 706.$i$ are stored in the Fragment Memory 705. Then, the length of the gap is determined as the difference of the section payload length and the length of all received fragments and is determined at step 907 as:

$$\Sigma L_{MF}:=L_{SC}-L_{RF}.$$

At step 913 the total length of all the missed fragments is set equal to $\Sigma L_{MF}$.

At step 910 erasure information is assigned to the missed fragments and the floating fragments and the missed fragments are erased. Then, the received fragments together with the (consecutive) missed fragments are placed consecutively in the MPE-FEC frame 1004 using the MPE-FEC frame table address which is contained in the received section header 705 that is stored in the Fragment Memory 700. If there is at least one group of floating fragments, i.e., at step 905 F≠0, there are at least two missed fragments: at least one before and at least one after the at least one group of floating fragments. At step 906 it is determined if these missed fragments have length 184 bytes (maximum packet payload length) by testing whether:

$$L_{RF}+K*184==L_{SC}.$$

If so, at step 908 all the lengths 703.$i$ of the missed fragments are assigned the maximum length of a fragment, i.e., 184 bytes and step 910 is performed such that all the fragments 706.$i$ inclusive of the floating fragments are placed in the MPE-FEC frame 1004 by using a missed fragment length of 184 and placing the fragments 706.$i$ consecutively in the MPE-FEC frame 1004 and assigning erasure information to the missed fragments and floating fragments.

If the missed fragments are not all 184 bytes in length, i.e., the test at step 906 fails, at least one of the missed fragments has a length<184 (apparently, adaptation field stuffing is applied in the corresponding TS packet). Since there is no way to know which of the missed fragments has a size smaller than 184 it cannot be determined where to place the floating fragment(s) into the MPE-FEC frame 1004. Therefore, at step 911 both the missed and floating fragment(s) are erased and the combination of missed and floating fragment(s) is a gap (hole) in the section (e.g., IP datagram). At step 911, the remaining received fragments (just after the section header and just before the CRC) can be placed in the MPE-FEC frame 1004 using the section length 705.1 and the MPE-FEC frame table address 705.2 in the section header 705.

If, at step 904, $L_{RF}+K*184>L_{SC}$, then one or more section headers have not been received or have been incorrectly received and the Fragment Memory 700 contains fragments 706.$i$ of more than one section, e.g., IP datagram. This can also be detected using the Continuity Counter (CC) and the section length 705.1. The number of TS packets needed for transferring a section, e.g., an IP datagram, of size L is approximately L/184, which is the difference between the CC value 301.$i$.1.8 of the TS packet containing the last fragment and the CC value 301.$i$.1.8 of the TS packet containing the first fragment (CC is assigned modulo 16, so allowance has to be made for wrap-around). In this case, the fragments that were received directly after the section header 705 are placed in the MPE-FEC frame 1004 using the MPE-FEC frame table address 705.2, which is present in the section header 705 stored in the Fragment Memory 700. At step 912, the fragments received just before the CRC and a new section header belonging to another IP datagram are placed in the MPE-FEC frame using the MPE-FEC frame table address 705.2 that is present in the new section header. This is possible since it is known that these last fragments and the fragments of the new section, e.g., IP datagram, should be placed consecutively in the MPE-FEC frame. However, too many uncertainties remain concerning the floating fragments to locate them in the MPE-FEC frame 1004 and the corresponding places are erased.

Figure 10:
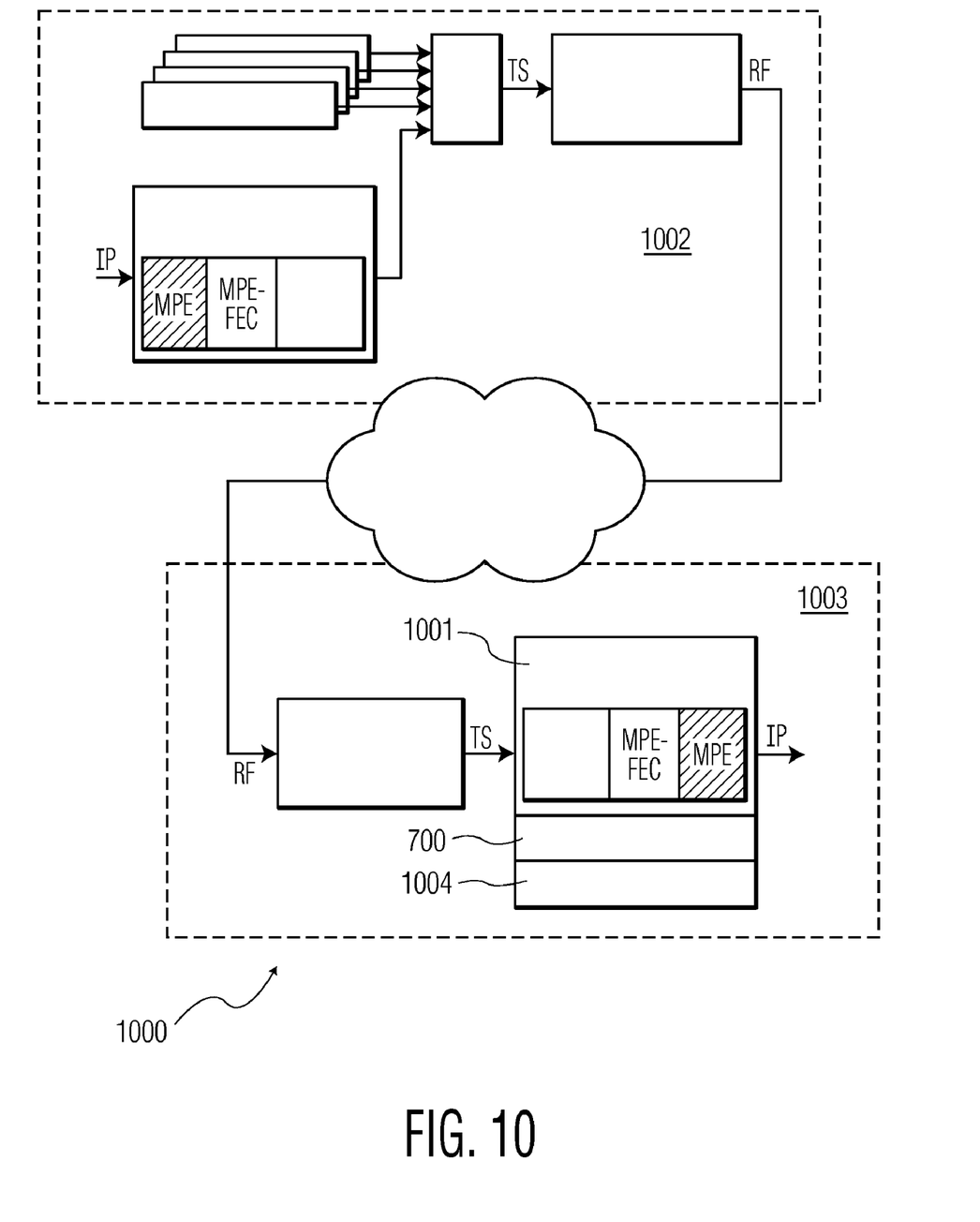
FIG. 10 illustrates a DVB receiver modified to include a DVB-H de-encapsulator according to the present invention.
Figure 11:
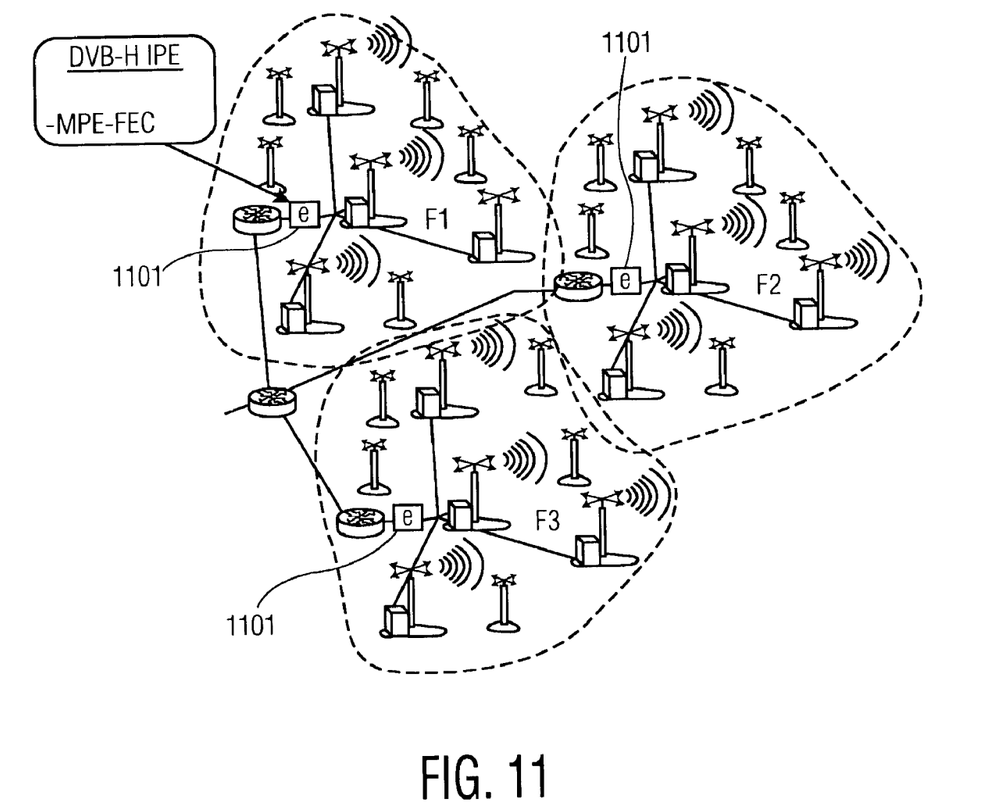
FIG. 11 illustrates a DVB-H dedicated network.

Referring now to FIG. 10, a receiver is shown comprising a de-encapsulator 1001 modified according to the present invention that uses a fragment memory 700 to limit lost parts to 184 bytes. Note that only the receiver needs to be modified, and an MPE-FEC ignorant receiver simply ignores MPE-FEC sections so that support for MPE-FEC is not mandatory. FIG. 11 illustrates a DVB-H dedicated network in which the DVB-H receivers may be modified according to the present invention to limit the amount of MPE loss to 184 byte parts.

While the preferred embodiments of the present invention have been illustrated and described, it will be understood by those skilled in the art that the management frame, device architecture and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

The invention claimed is:

1. An apparatus for reconstruction of a section transmitted in a plurality of packets, wherein the section comprises a plurality of fragments, wherein each of the plurality of packets includes a header and a payload, wherein the header comprises an integer continuity counter CC that counts lost packets of the plurality of packets, and wherein the payload includes at least one of the plurality of fragments, the apparatus comprising:
   a fragment memory adapted to store at least a portion of the plurality of fragments, the fragment memory comprising:
      a plurality of columns; and
      a fragment pointer FP pointing at a first column of the plurality of columns to receive a first fragment of the plurality of fragments, wherein the first fragment is received in a first packet of the plurality of packets;
   a frame memory adapted to store at least a portion of the fragment memory; and
   a de-encapsulator module configured to—
      maintain a shadow counter SC to track an expected value of CC and to initialize SC=CC, and enforce a predetermined consistency criteria of SC=CC,
      maintain a discontinuity counter DC, a missed fragment counter K,
      when the first packet is one of:
         received correctly, and
         includes an un-correctable error and CC=SC, then store the first fragment at the first column of the fragment memory pointed at by FP and then adjust FP and SC to respectively point at a second column of the plurality of columns to receive a second fragment of the plurality of fragments and the value of CC expected in a second packet of the of the plurality of packets; and
      when the first packet includes the un-correctable error and CC≠SC, to ignore the first packet.

2. The apparatus of claim 1, wherein the un-correctable error is indicated by a transport error indicator included in the header of the first packet.

3. The apparatus of claim 2, wherein the header of the first packet includes a Packet Identifier PID to indicate a service type and the de-encapsulator module is further configured to ignore the first packet in accordance with a predetermined PID acceptance scheme.

4. The apparatus of claim 3, wherein the de-encapsulator module is further configured to if the first packet is received correctly and CC≠SC, then:
   advance FP and K based at least on a difference between CC and SC,
   set SC=CC,
   increment DC, and
   record a last missed fragment LMF as a third column just prior to FP and if a first missed fragment FMF is null to set FMF=LMF.

5. The apparatus of claim 4, wherein: the fragment memory is further configured to have an erasure information associated with each of the plurality of columns; and when each of the plurality of fragments have been stored in the fragment memory or ignored, the de-encapsulator module is further configured to:
   when there are missing fragments indicated by at least one of the plurality of columns having an associated length variable of 0, set the associated erasure information to a predetermined value and set a group counter F to a number of floating group fragments=DC−I, wherein I is an integer,
   when there are no missed fragments, process a cyclic redundancy check CRC received in the payload of one of the plurality of packets and set the erasure information for each of the plurality of columns based on a result of the CRC, and
   store at least a portion of the fragment memory in the frame memory in accordance with a pre-determined storage scheme based on K and F.

6. The apparatus of claim 5, wherein the pre-determined storage scheme is as follows:
   when K=0, then store at least a portion of the fragment memory at a first address in the frame memory indicated by a first table address received in a first section header;
   when K≠0 and at least one fragment of a current section and a next section is stored in the fragment memory, then store the plurality of fragments of the fragment memory at a second address in the frame memory indicated by a second table address received in a second section header;
   when K≠0 and fragments from only one section are stored in the fragment memory, then a missed fragments length of one or more missed fragments is determined based on an adaptation field stuffing and using the missed fragments length, each of the plurality of fragments is stored consecutively at a third address in the frame memory indicated by a third table address received in a third section header.

7. The apparatus of claim 6, wherein when F≠0 and the missed fragments length is not fixed, one or more missed and floating fragments are erased from the fragment memory prior to storing at least a portion of the fragment memory in the frame memory.

8. A method for reconstructing a section comprising a plurality of fragments, wherein the plurality of fragments are received in a plurality of packets, and wherein each of the plurality of packets includes a header and at least one fragment of the plurality of fragments, the method comprising:
   receiving, by a digital broadcast receiver, a first packet of the plurality of packets, wherein the first packet includes a first fragment of the plurality of fragments;
   maintaining a fragment pointer FP pointing at a first column of a fragment memory to receive the first fragment, a shadow counter SC to track an expected value of an integer continuity counter CC included in the header of each of the plurality of packets, a discontinuity counter DC, a missed fragment counter K and a floating fragment counter F;
   initializing SC=CC;
   when the first packet is one of:
      received correctly, or
      includes an un-correctable error and CC=SC, then performing the steps of—
         storing the first fragment at the first column of the fragment memory pointed at by FP, and adjusting FP and SC to respectively point at a second column to receive a second fragment of the plurality of fragments and an expected value of CC expected in the header of a second packet of the plurality of packets; and when the first packet includes the un-correctable error and CC≠SC, ignoring the first packet.

9. The method of claim 8, further comprising the steps of:
setting an associated erasure information of each column of a plurality of columns to a predetermined value based on whether the first fragment includes an un-correctable error or has no associated address information, and when the fragment memory comprises a section performing the steps of—
   setting the erasure information for each column of the plurality of columns based on a result of performing cyclic redundancy check CRC processing.

10. The method of claim 8, further comprising the step of determining that the first packet includes the un-correctable error from a transport error indicator included in the header of the first packet.

11. The method of claim 8, further comprising the step of ignoring the first packet if the header of the first packet includes a Packet Identifier PID of a pre-determined service type.

12. The method of claim 10, further comprising when the first packet is received correctly and CC=SC performing the steps of:
   advancing FP and K based at least on a difference between CC and SC;
   setting SC=CC;
   incrementing DC;
   recording a last missed fragment (LMF) as a column just prior to FP; and
   if a first missed fragment FNF is null, setting FMF=LMF.

13. The method of claim 11, further comprising the step of:
   when one or more of a plurality of columns has an associated length variable of 0 performing further steps of setting an associated erasure information to a predetermined value and setting the floating fragment counter F to a number of groups of floating fragments;
   otherwise performing the steps of setting the erasure information for each column based on a result of processing a cyclic redundancy check CRC and storing at least a portion of the fragment memory in a frame memory in accordance with a pre-determined storage scheme based on K and F.

14. The method of claim 12, wherein the step of storing at least a portion of the fragment memory in a frame memory in accordance with the pre-determined storage scheme based on K and F comprises the steps of:
   when K=0 storing at least a portion of the fragment memory at a first address in the frame memory indicated by a first table address received in a first section header;
   when K≠0 and the fragment memory comprises at least one fragment of a current section and a next section, storing at least a portion of the fragment memory at a second address in the frame memory indicated by a second table address received in a second section header of one of the current section and the next section to store at least a portion of the fragment memory in the frame memory;
   when K≠0 and the fragment memory comprises only the current section, performing the steps of determining a missed fragments length based at least on an adaptation field stuffing and using the missed fragments length to consecutively store at least a portion of the fragment memory at a third table address received in a third section header.

15. The method of claim 13, further comprising the step of when F≠0 and a missed fragments length is not fixed, then erasing one or more missed or one or more floating fragments from the fragment memory prior to storing at least a portion of the plurality of fragments of the fragment memory in a frame memory.

* * * * *